T. H. RUSSELL.
POT FOR CONTAINING BEVERAGES.
APPLICATION FILED SEPT. 1, 1910.
986,865.
Patented Mar. 14, 1911.
2 SHEETS—SHEET 1.
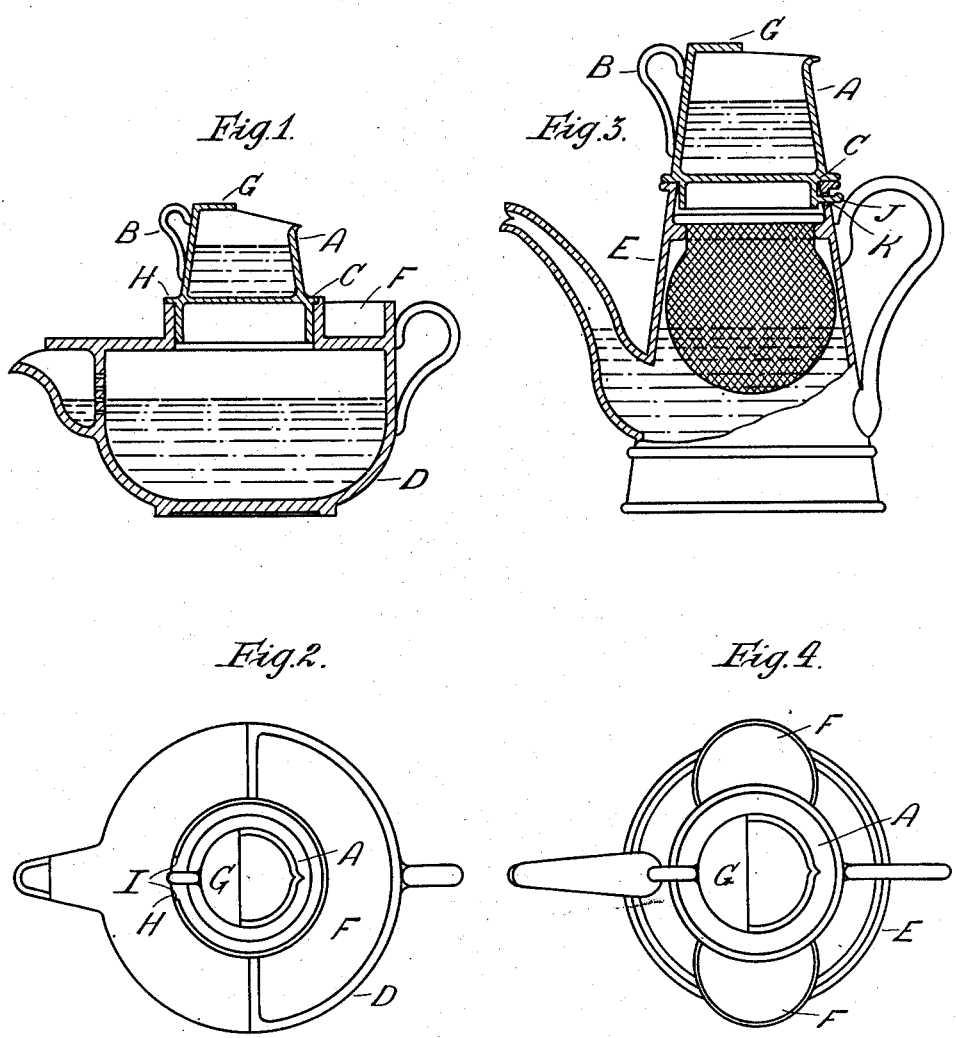
WITNESSES;
INVENTOR,
THOMAS HENRY RUSSELL,
by
Attorney.

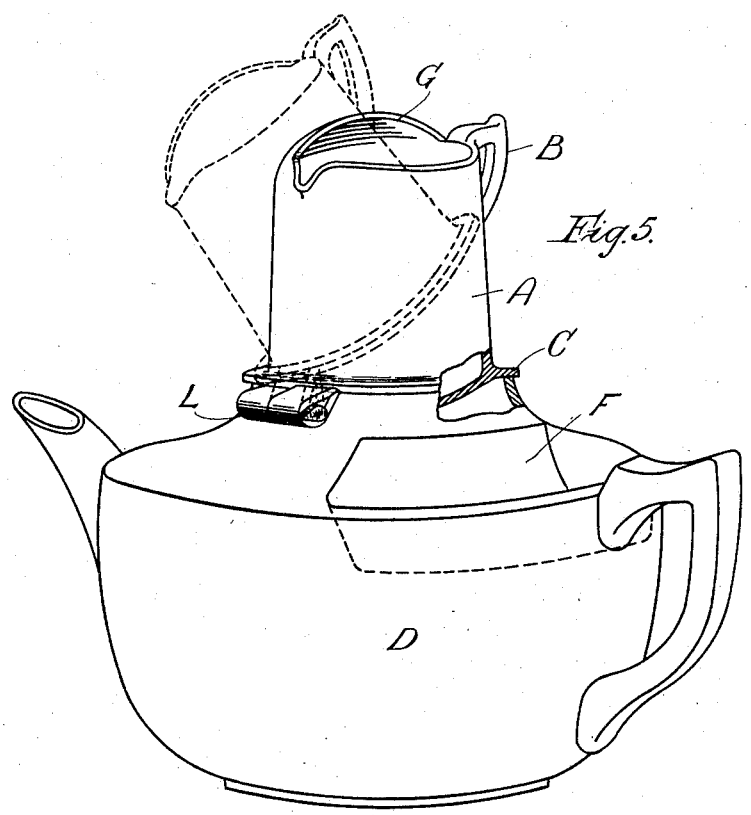

UNITED STATES PATENT OFFICE.

THOMAS HENRY RUSSELL, OF CLACTON-ON-SEA, ENGLAND.

POT FOR CONTAINING BEVERAGES.

986,865.  Specification of Letters Patent.  Patented Mar. 14, 1911.

Application filed September 1, 1910. Serial No. 580,094.

*To all whom it may concern:*

Be it known that I, THOMAS HENRY RUSSELL, a subject of the King of the United Kingdom of Great Britain and Ireland, and resident of Clacton-on-Sea, Essex, England, have invented a certain new and useful Improvement in Pots for Containing Beverages, of which the following is a specification.

This invention relates to improvements in pots for containing beverages, e. g., teapots, coffee pots and the like and it has for its object to provide a pot which is adapted for use more particularly in restaurants where a uniform quantity of sugar and milk is to be supplied with the tea or coffee to the customer.

In the accompanying drawings Figure 1 is a vertical section and Fig. 2 is a plan of a teapot embodying the improvements. Figs. 3 and 4 show the improvements applied to a coffee pot. Fig. 5 shows a modification.

Like reference characters denote like parts in the several views of the drawings.

Referring to the drawings, a milk receptacle A (with or without a handle B) is made in one with the removable lid C of a teapot D (Figs. 1, 2 and 5) or a coffee pot E (Figs. 3 and 4) or the like, and said pot is also formed with one or more receptacles F adapted to contain sugar. As shown, each teapot D has a single receptacle F for sugar and the coffee pot E has two such receptacles, but the number of receptacles may be varied to suit requirements. The receptacle A for the milk may be partly covered, as shown at G, so as to prevent overflow of its contents while the tea or coffee is being poured out.

To insure proper relationship of the combined lid and milk receptacle with the pot, said lid may be formed with a lug H adapted to engage with a recess I in the pot, as shown in Fig. 2; or said lid may be provided with a projection J adapted to engage with a vent hole K in the pot, as shown in Fig. 3.

The milk receptacle may be hinged to the pot as shown at L (Fig. 5). The hinge is preferably so formed that the receptacle can only be removed from the pot when it is turned into inverted position. To this end the leaf is formed in two portions one of which is attached to the milk receptacle while the other is attached to the pot and is formed with a projecting bolt formed with a shaped head which extends in the opposite direction to that normally assumed by the portion of the hinge leaf which is movable thereon. The hinge portion is so shaped that when the milk receptacle is inverted it can be moved laterally over the shaped head and thus removed. It can be returned by reversing the operation.

The preferred form is intended to be used as a coffee and tea pot in which the contents may be brewed.

The several parts of the pot may be made of any suitable material such as earthenware or metal.

Having now described my invention what I claim and desire to secure by Letters Patent of the United States is:—

The combination with a pot for containing tea or coffee, said pot formed with a receptacle for containing sugar and the like, of a detachable hinged lid for said pot, and a milk receptacle integral with said lid, substantially as described.

In testimony whereof I have signed my name to this specification in the presence of two subscribing witnesses.

THOMAS HENRY RUSSELL.

Witnesses:
    A. L. BURBERG,
    HAROLD C. FAIRWEATHER.